June 2, 1959     J. W. ACKLEY     2,888,891
LIQUID FERTILIZER ATTACHMENT
Original Filed July 6, 1956     2 Sheets-Sheet 1

INVENTOR.
JOHN W. ACKLEY
BY
ATTORNEYS

June 2, 1959   J. W. ACKLEY   2,888,891
LIQUID FERTILIZER ATTACHMENT
Original Filed July 6, 1956   2 Sheets-Sheet 2

INVENTOR.
JOHN W. ACKLEY
ATTORNEYS

United States Patent Office 2,888,891
Patented June 2, 1959

2,888,891
LIQUID FERTILIZER ATTACHMENT

John W. Ackley, Moline, Ill., assignor, by mesne assignments, to Deere & Company, a corporation of Delaware Original application July 6, 1956, Serial No. 596,332. Divided and this application October 22, 1957, Serial No. 691,752

2 Claims. (Cl. 111—80)

This application is a division of my copending application, Ser. No. 596,332, filed July 6, 1956, for Liquid Fertilizer Attachment.

The present invention relates generally to agricultural implements and more particularly to planting and fertilizing implements.

The object and general nature of the present invention is the provision of a planting and fertilizing implement particularly constructed and arranged to plant a plurality of rows and distribute liquid fertilizer in or along the rows at the same time that the planting is done. More specifically, it is a feature of this invention to provide a new and improved metering structure that is particularly arranged to take the place of the usual dry fertilizer tube connections of the planter furrow openers, whereby the use of the present invention as incorporated in a liquid fertilizer attachment requires little if any change in the structure of the planting implement itself, thereby making the attachment of the liquid distributing means and the operation thereof quick and convenient. It is also a feature of this invention to provide a metering arrangement in which the fertilizer delivery rate may be easily adjusted when desired.

These and other objects and advantages of the present invention will be apparent to those skilled in the art after a consideration of the following detailed description of the preferred structure and embodiment of this invention, taken in conjunction with the accompanying drawings, in which.

Figure 1:
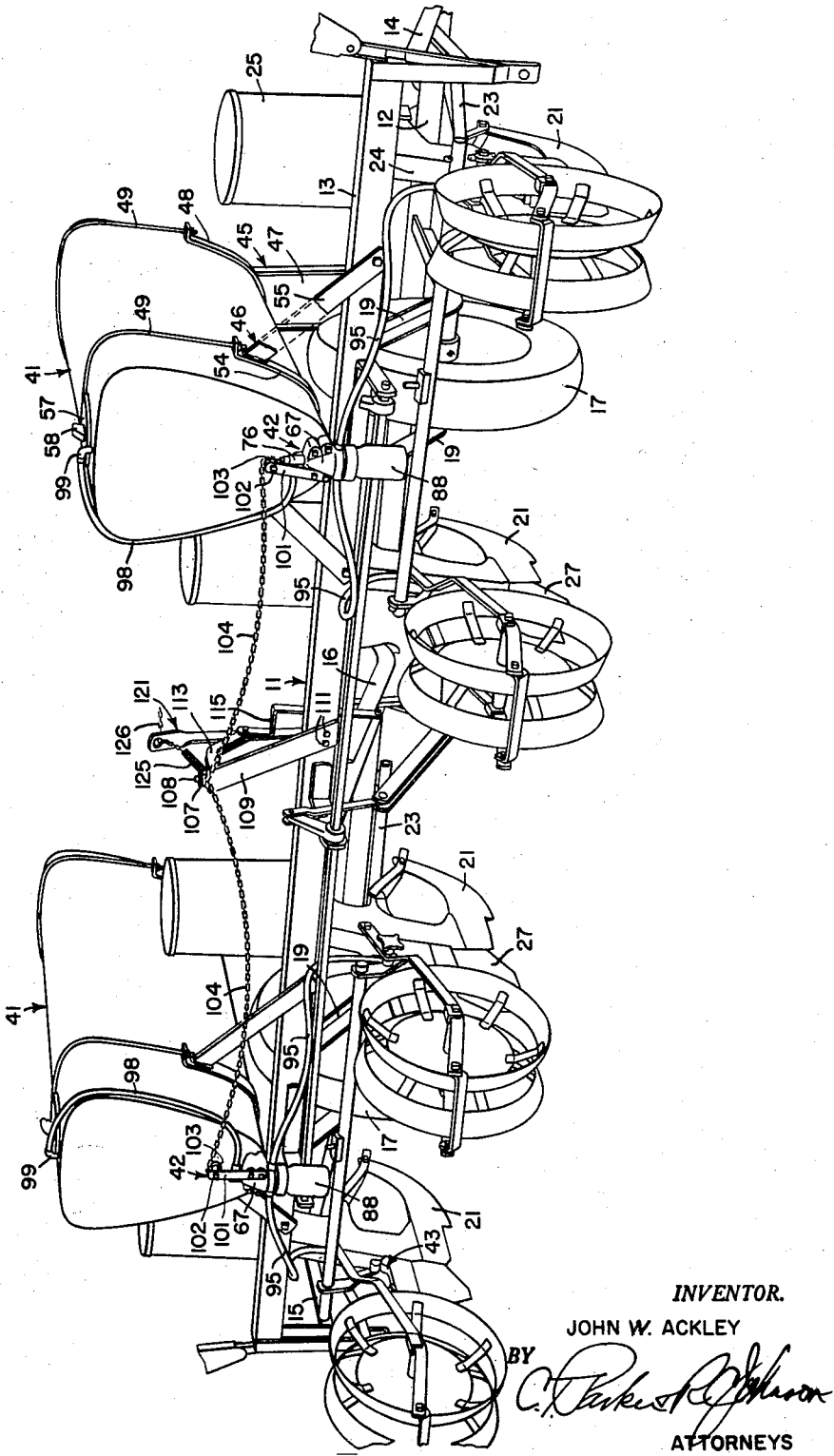
Fig. 1 is a perspective view of a planting and liquid distributing implement in which the principles of the present invention have been incorporated.
Figure 2:
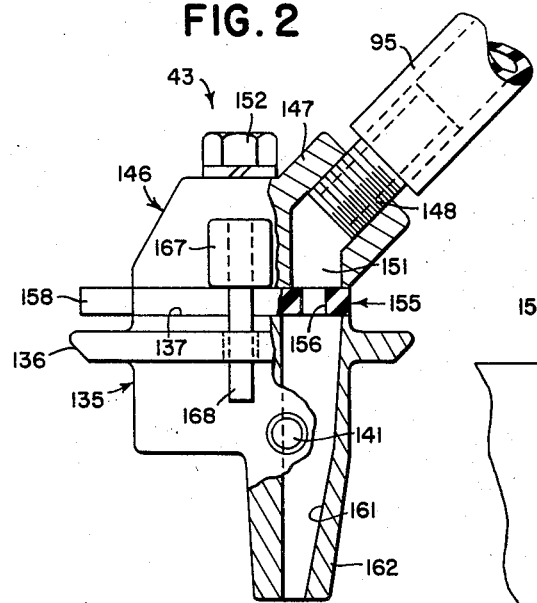
Fig. 2 is a sectional view taken through one of the metering heads that is connected with the distributing valve unit and is carried by the associated furrow opener of the planter.

Referring first to Fig. 1, it will be seen that the present invention has been illustrated as incorporated in a four-row planting and liquid distributing implement in which, for purposes of illustration, the liquid distributing means, taken as a whole, is shown as an attachment to a four-row corn planter quite similar to that shown in U.S. Patent 2,376,464, issued May 22, 1945, to C. H. White, to which reference may be made if necessary. Briefly, the planter comprises frame means 11 that is made up of a front lower sill bar 12, extending transversely relative to the direction of travel, and a rear transverse sill bar 13 connected together at their ends by right and left hand crossbars 14 and 15. The sill bars 12 and 13 are also connected together by intermediate bars one of which can be seen at 16. The frame 11 is supported on two ground wheels 17 each being journaled for rotation on axle means carried by a wheel frame, each wheel frame being made up of a pair of laterally spaced apart wheel frame bars 19 between which the associated ground wheel 17 is disposed. The planter also includes a plurality of furrow openers 21 connected with the front sill bar 12 by upper and lower links 23 to the rear ends of which is connected a generally vertically disposed shank 24 that carries at its upper end a seed hopper 25 containing suitable seed selecting mechanism of conventional construction. In the planter shown in Fig. 1, four planting units are shown and each unit includes a rear fertilizer boot 27 having an opening into which normally a fertilizer tube is connected, usually in the mnaner indicated in Fig. 8 in U.S. Patent 2,369,508, issued February 13, 1945, to C. H. White. Generally, the connection between the fertilizer tube, usually formed as a ribbon, and the fertilizer boot is in the nature of a bayonet joint, including a pin or a pair of pins on the lower end of the fertilizer tube and an L-shaped slot, or a pair of such slots, formed on the inside of the fertilizer opening receiving the fertilizer tube. A joint of this kind is shown in the patent to Smith, 422,987, issued March 11, 1890. Detailed reference to the connection between the conventional fertilizer tube and the associated fertilizer boot of the furrow opener is made here for the reason that the particular construction of the metering head of the liquid dispensing mechanism of the present invention is especially adapted to cooperate with a fertilizer boot of the construction just described, so that when utilizing the liquid dispensing means of the present invention, no change need be made in the fertilizer boot of the planter runners or furrow openers.

The planter shown in Fig. 1 is also equipped with power lift mechanism substantially like that disclosed in the White Patent 2,376,464. Such mechanism includes a self-interrupting clutch unit driven from the ground wheels 17 of the implement and connected through suitable means to raise and lower the planter runners 21. Such means is also connected, according to this invention, to control fertilizer distributing valve means which will be referred to below.

According to the principles of the present invention, liquid dispensing mechanism is associated with the planter and, in general, comprises a pair of liquid fertilizer containing tanks 41 and suitable controlling valve means 42 and adjustable metering units 43. There is a liquid distributing valve unit 42 for each tank 41 and a metering unit 43 of the planter furrow opener units 21.

Each of the tanks 41 is supported by a front bracket structure 45, carried by the front sill bar 12 of the planter, and a rear bracket structure 46 carried by the rear sill bar 13. Each tank 41 is supported by the planter frame directly over the associated ground wheel 17 and substantially axially centered, both laterally and in a fore-and-aft direction, over the the associated wheel. The front bracket structure 45 comprises a generally vertically disposed channel member 47 having at its upper end a generally U-shaped cradle strap 48, the upper ends of which are turned laterally outwardly and apertured to receive a tank-securing U-bolt 49. As will best be seen from Fig. 1, each tank 41 is generally elongated and of substantially pear-shaped configuration, being relatively narrow in the lower portion and widening upwardly, the depth of the tank being considerably greater than the transverse width at the widest point. The cradle strap 48 is, of course, of corresponding configuration.

The rear mounting bracket 46 for the tanks 41 comprises a cradle strap 54, a pair of brace links 55 extending downwardly and laterally outwardly from the upper portion of the cradle strap 54. The upper ends of the latter are turned outwardly and apertured to receive a second tank-securing U-bolt 49 for the rear portion of the associated tank 41.

Access to the interior of each tank is provided by means of a removable closure cover 57 in the form of a round disk and associated clamping means 58 that secures the disk to the tank in sealed relation. As will best be seen from Fig. 1, the front brackets 45 are longer than the rear brackets 46 so as to accommodate the higher position of the rear sill bar 13. The front brackets 45 are of substantial width and serve to prevent any lateral displacement of the front ends of the associated tank. Lateral displacement of the rear end of the tank is prevented by the downwardly and outwardly diverging cradle legs 55. The rear end of each tank is adapted to receive an associated distributing valve structure 42 as mentioned briefly above, and these valve structures will now be described.

Each tank 41 is arranged so that its rear end extends rearwardly a substantial distance of the associated rear sill bar 13. The rear end plate of the tank is provided with four apertures to receive bolt means by which a distributor valve body, shown generally at 67, is fixed to the associated tank 41. The valve means, of which the valve body 67 is a part, also includes the valve stem 76 that extends upwardly from the valve body 67 and receives operating means to which reference will be made below. The valve means just described also includes a lower removable sediment chamber, which may be in the form of a commercially available Mason jar 88. Delivery tubes 95 lead from each valve body 67 downwardly to the runners 21 to which the lower of discharge ends of the tubes 95 are respectively connected, as will be described below. Preferably, the delivery tubes 95 are of transparent plastic material of any suitable composition and have the advantage that they permit the operator to ascertain visually whether or not liquid is flowing through the tubes 95. A transparent tube 98, also preferably of plastic or the like, is connected at its lower end into the valve body 67, and at its upper end each tube 98 is connected to a nipple 99 by which the upper portion of the tube is connected into the space in the upper portion of the tank 41.

In order to provide means to open and close the valve 76, a bracket 101 is carried by the casing 67, being fixed to the latter by two of the bolts that fix the casing to the fertilizer tank 41. The upper end of the bracket 101 is apertured to receive a bolt 102 on which a roller 103 is mounted. A chain 104 is trained over the roller 103 and extends downwardly to the valve stem 76, being connected to the latter by a pin or other suitable fastening means. Thus, a pull on the chain 104 serves to lift the valve 76 against the bias of associated spring means, which normally tends to close the valve 76. This opens communication between the tank and discharge tubes 95 through the associated sediment chamber 88. When the pull on the cable 104 is released the valve 76 closes, thus terminating delivery of liquid through the associated delivery tubes 95. Each delivery tube discharges into or through a metering unit on the associated furrow opener unit 21, reference to which will be made below.

The chains 104 from the two tanks 41 extend laterally inwardly from the associated rollers 103 and are disposed around a guide 107, which may be a roller like the roller 103, mounted by means of a bolt 108 on the upper end of a center post 109, preferably in the form of a plate member secured to the rear sill angle 13 by a pair of bolts 111 at its lower end, the upper end being bent forwardly into a horizontal plane and apertured to receive the bolt 108. The latter also secures the rear or bight portion of a valve control arm guide member 113 to the post or bracket 109. The front end of the control arm guide member is connected to and supported on the upper end of a support bar 115, the lower end of which is connected rigidly to the planter frame. The upper end of the supporting bar 115 is offset laterally so as to bring the upper end thereof in the plane of the guide member 113 between the two portions of which a valve control arm 112 is adapted to move. The arm 121 is mounted for rocking movement by a bolt 118 on the support 115. The lower end of the arm 121 is connected to the planter runner raising and lowering means such that when the planter runners are lowered the arm 121 is swung forwardly. This movement of the arm 121 actuates the chains 104 by virtue of their forward connection through a spring 125 with a manually controlled tension member, such as a cable or chain 126 that extends forwardly to the operator's station on the tractor. The chain or cable 126 may be connected to or released from the arm 121 by any suitable means at the option of the operator. When the chains 104 are pulled forwardly, the valves 76 are opened, and when the valve control arms 121, with cable 126 attached thereto, swings rearwardly, the valves are closed. At any time the operator desires to do so, he may pull forwardly on the chain or cable 126, and thus open the valve 76 manually, independently of the position of the valve control arm 121. On the other hand, if the operator should desired the valve to remain closed even though the furrow openers are lowered and the arm 121 swung forwardly, the operator may disengage the cable 126 from the arm 121 so that forward movement of the latter will not exert any pull on the chains 104.

The metering units 43 will now be described.

Figure 3:
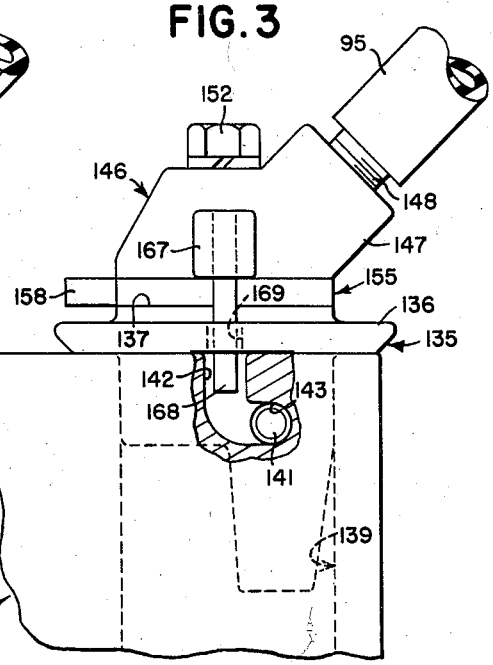
Fig. 3 is a side view of the metering head, showing the manner in which the metering head fits and is secured in the opening of the planter runner into which a conventional fertilizer tube ordinarily is connected.
Figure 4:
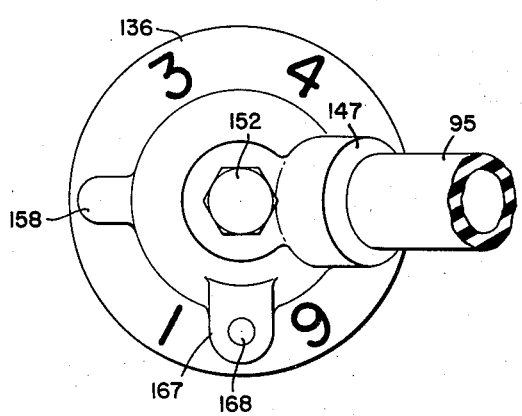
Fig. 4 is a top view of the metering head

As mentioned above, there is a metering unit 43 fixed to the rear portion of the fertilizer boot on each planter furrow opener. Each of the metering units 43 includes a base member 135 having an upper head section 136 carrying indicia in the form of the numbers 1 through 6 around the peripheral portion thereof and a relatively flat generally central section 137. The main portion of the base 135 is adapted to extend downwardly into the fertilizer tube receiving opening 139 of the fertilizer boot 27, as shown in Fig. 3. A lug or projection 141 is formed on the outer side of a portion of the base member 135, and each of these lugs, there being a lug 141 at each side of the member 135, is adapted to enter the associated bayonet connection slot entrance 142, and then after the member 135 has been turned to carry the lugs 141 into the socket portions 143 of the associated bayonet slots, the base member 135 is secured to the associated fertilizer boot. The upper member of the metering unit 43 includes a cap member 146 which is formed with an inlet extension 147 tapped to receive a nipple 148 to which the lower end of the associated delivery tube 95 is connected. The inlet extension 147 communicates with an interior chamber 151 disposed at one side of the cap member, the latter and the base member 135 being centrally apertured to receive a connecting stud 152 by which the parts of the metering unit are adapted to be connected tightly together.

Disposed between the cap member and the base member is a metering gasket 155 which is formed as a flat disk-like part having a plurality of openings 156 of different sizes disposed about the central opening 157 through which the connecting bolt 152 extends. An index tab 158 extends outwardly from a portion of the metering disk 155 and cooperates with the indicia numbers on the flange 136 of the base to provide an indication as to which of the plurality of openings 156 that lies between the cap chamber 146 and the associated opening 161 in the base member 135, which fits into the associated fertilizer tube opening in the planter runner, the base 135 having a nozzle-like section 162 through which liquid is discharged into the furrow. Thus by loosening the bolt 152 and turning the orifice disk 155 into different positions, openings of different sizes may be brought into cooperative relation between the inlet extension 147 and the nozzle section or outlet 162 of the base member 135, all for the purpose of controlling the rate of delivery when the associated valve means is open.

Figure 5:
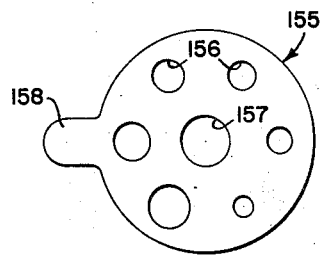
Fig. 5 is a detail view of one of the metering disks.

The cap member 146 is provided with an extension 167 that carries a depending pin 168. This pin extends downwardly through an opening 169 in the flange 136 of the base member 135. One purpose of this arrangement is to maintain the openings in the cap member and base member in proper registry, and another purpose of this pin is to extend downwardly into the entrance opening 142 of the bayonet slot in the fertilizer boot, as shown in Fig. 5, so that the base member 135 is thus locked against accidental turning or other displacement relative to the fertilizer boot. It can be seen from Fig. 5 that if the lugs 141 are retained in the slot sockets 143, the base member 135 is locked to the associated fertilizer boot.

The rate of flow may be adjusted by removing the bolt or stud 152, taking the cap member 146 off of the associated base member, turning the orifice disk 155 to the desired position, and then replacing the cap member 146 and tightening the same in a new position of the orifice disk 155.

While I have shown and described above the preferred structure in which the principles of the present invention have been incorporated, it is to be understood that my invention is not to be limited to the particular details, shown and described above, but that, in fact, widely different means may be employed in the practice of the broad aspects of my invention.

What I claim, therefore, and desire to secure by Letters Patent is:

1. In a planter and liquid distributing implement having a seed furrow opener and a fertilizer boot connected with the latter, said boot having a fertilizer-receiving opening, the improvement comprising a liquid metering head having a portion insertible into the fertilizer-receiving opening, means on said head to secure the latter to said fertilizer boot, and flow controlling means carried by said head, said fertilizer boot having a generally horizontal slotted portion and a generally vertical entrance opening communicating with said slotted portion at one end thereof, said metering head including a lug disposable in said horizontal slotted portion in the end thereof spaced from said entrance opening, and means also carried by said head and engageable in said entrance opening for locking said metering head in place on said fertilizer boot.

2. In a planter and liquid distributing implement having a seed furrow opener and a fertilizer boot connected with the latter, said boot having a fertilizer-receiving opening and a bayonet-type connection socket disposed adjacent said opening, the improvement comprising a liquid metering head comprising a base member having a central opening, a cap member having a central opening, and securing means extending through said openings for fixing said cap member to said base member, and flow controlling means comprising a disk member also having a central opening disposed between said cap member and said base member and receiving said securing means, said disk member having a plurality of metering openings of different sizes, conduit means including a downward extension on the base member having a portion insertible into the fertilizer receiving opening, a locking pin carried by said cap member and extending through said base member below the latter a distance sufficient to enter said socket, thereby serving to hold the cap and base members against displacement and also as means on said head disposable in said socket to secure the head to said fertilizer boot.

References Cited in the file of this patent
UNITED STATES PATENTS

| | | |
|---|---|---|
| 422,987 | Smith | Mar. 11, 1890 |
| 2,159,652 | Brunner | May 23, 1939 |
| 2,164,066 | Holle | June 27, 1939 |
| 2,219,504 | Willis | Oct. 29, 1940 |
| 2,249,874 | White | July 22, 1941 |